United States Patent
Takano et al.

(10) Patent No.: US 6,201,585 B1
(45) Date of Patent: Mar. 13, 2001

(54) ELECTRONIC APPARATUS HAVING THIN FILM TRANSISTORS

(75) Inventors: Tamae Takano; Hisashi Ohtani, both of Kanagawa (JP)

(73) Assignee: Semiconductor Energy Laboratory Co., Ltd. (JP)

(*) Notice: Subject to any disclaimer, the term of this patent is extended or adjusted under 35 U.S.C. 154(b) by 0 days.

(21) Appl. No.: 09/233,771
(22) Filed: Jan. 19, 1999

(30) Foreign Application Priority Data

Jan. 21, 1998 (JP) .................................................. 10-023998

(51) Int. Cl.$^7$ ............................ G02F 1/136; G02F 1/1335
(52) U.S. Cl. ...................................... 349/42; 349/5; 349/6
(58) Field of Search ......................... 349/5–8, 42; 353/31, 353/35; 257/66, 72; 345/92

(56) References Cited

U.S. PATENT DOCUMENTS

| | | | |
|---|---|---|---|
| 5,499,126 | * 3/1996 | Abileah et al. | 359/68 |
| 5,656,825 | * 8/1997 | Kusumoto et al. | 257/66 |
| 5,681,756 | * 10/1997 | Norman et al. | 437/1 |
| 5,743,611 | * 4/1998 | Yamaguchi et al. | 349/5 |
| 5,825,052 | * 10/1998 | Shakuda | 257/94 |
| 5,963,276 | * 1/2000 | Inbar | 349/5 |
| 6,013,930 | * 1/2000 | Yamazaki et al. | 257/353 |

FOREIGN PATENT DOCUMENTS

| | | |
|---|---|---|
| 8-78329 | 3/1996 | (JP) . |
| 9-312260 | 12/1997 | (JP) . |

\* cited by examiner

*Primary Examiner*—William L. Sikes
*Assistant Examiner*—Tarifur R. Chowdhury
(74) *Attorney, Agent, or Firm*—Cook, Alex, McFarron, Manzo, Cummings & Mehler, Ltd.

(57) ABSTRACT

In a projector using an optical engine that is constituted of three LCDs, the active layer thickness of TFTs constituting each LCD is optimized in accordance with the wavelength of illumination light. By making the active layer thickness smaller as the wavelength becomes shorter, leak current due to stray light is suppressed and the degrees of display failures such as crosstalk can be lowered to levels that are not problematic.

14 Claims, 7 Drawing Sheets

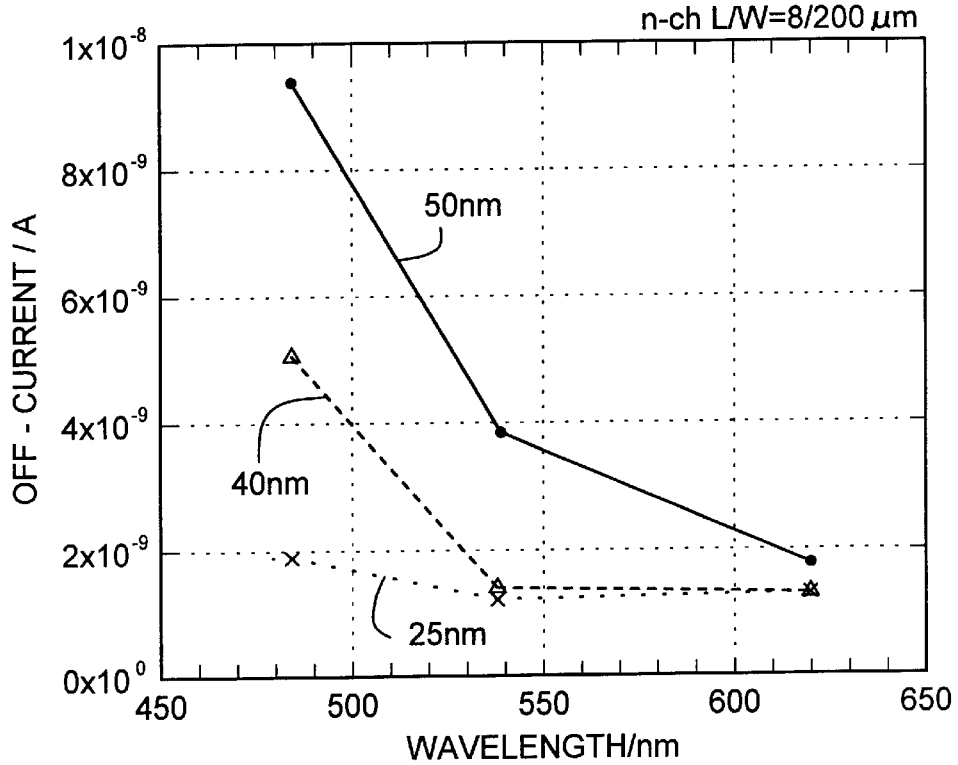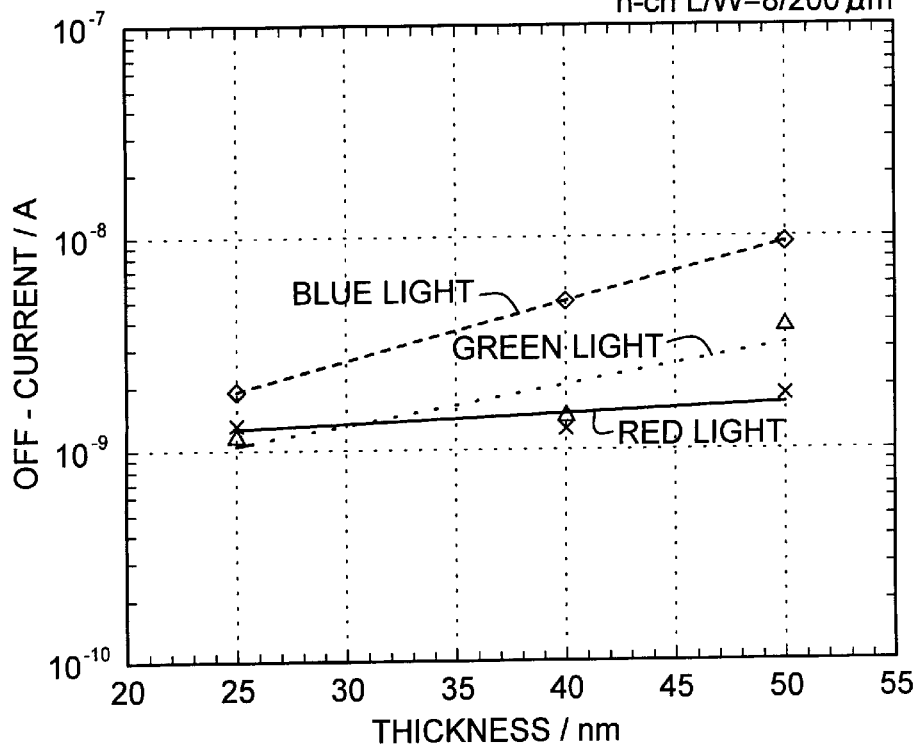

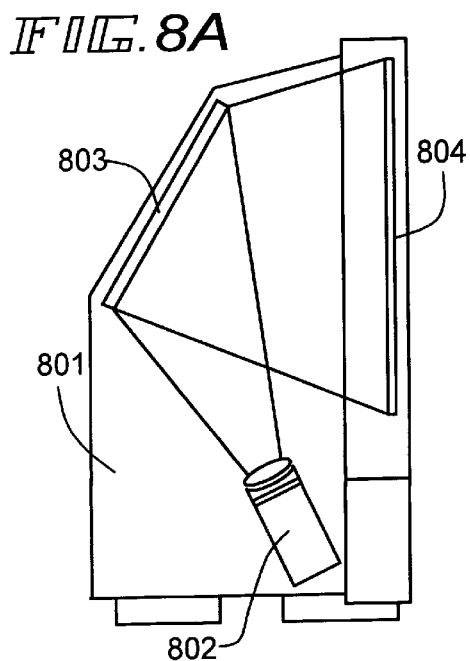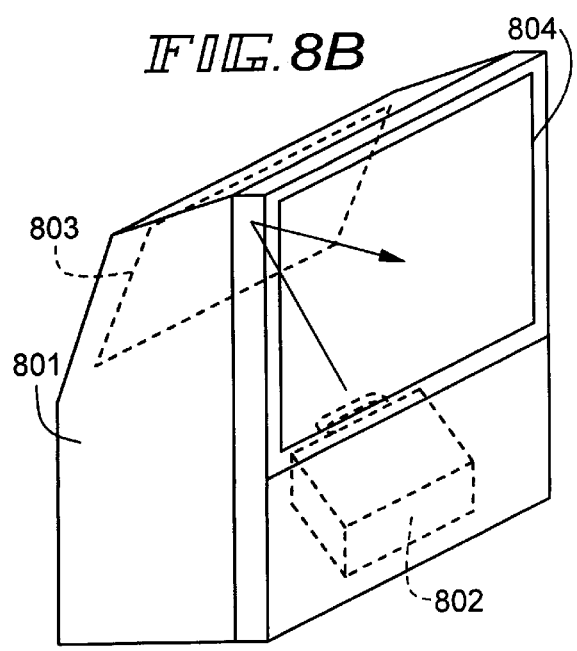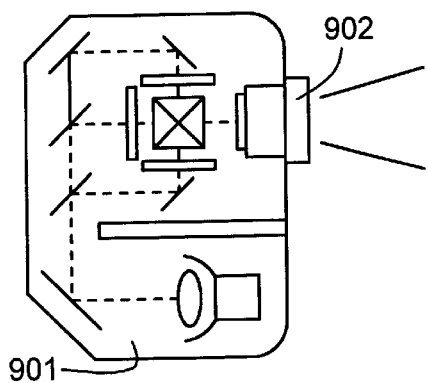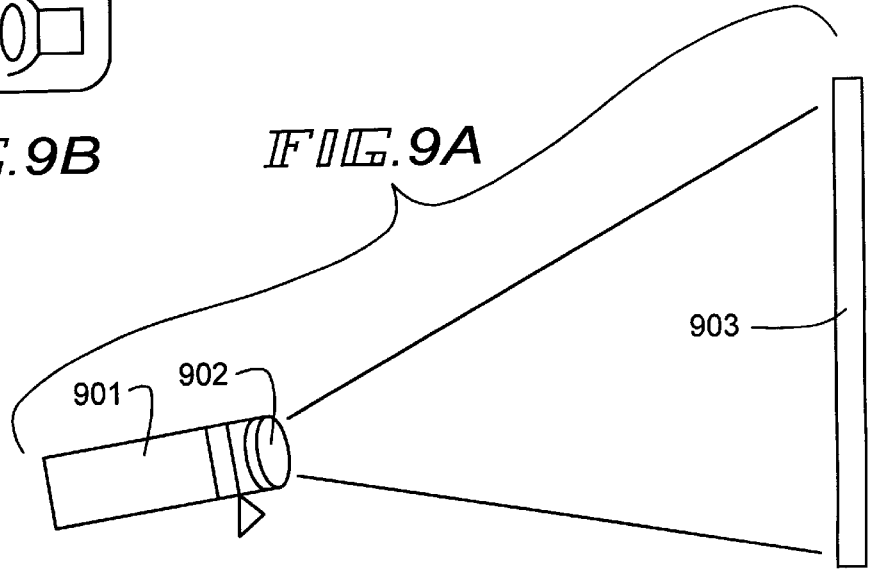

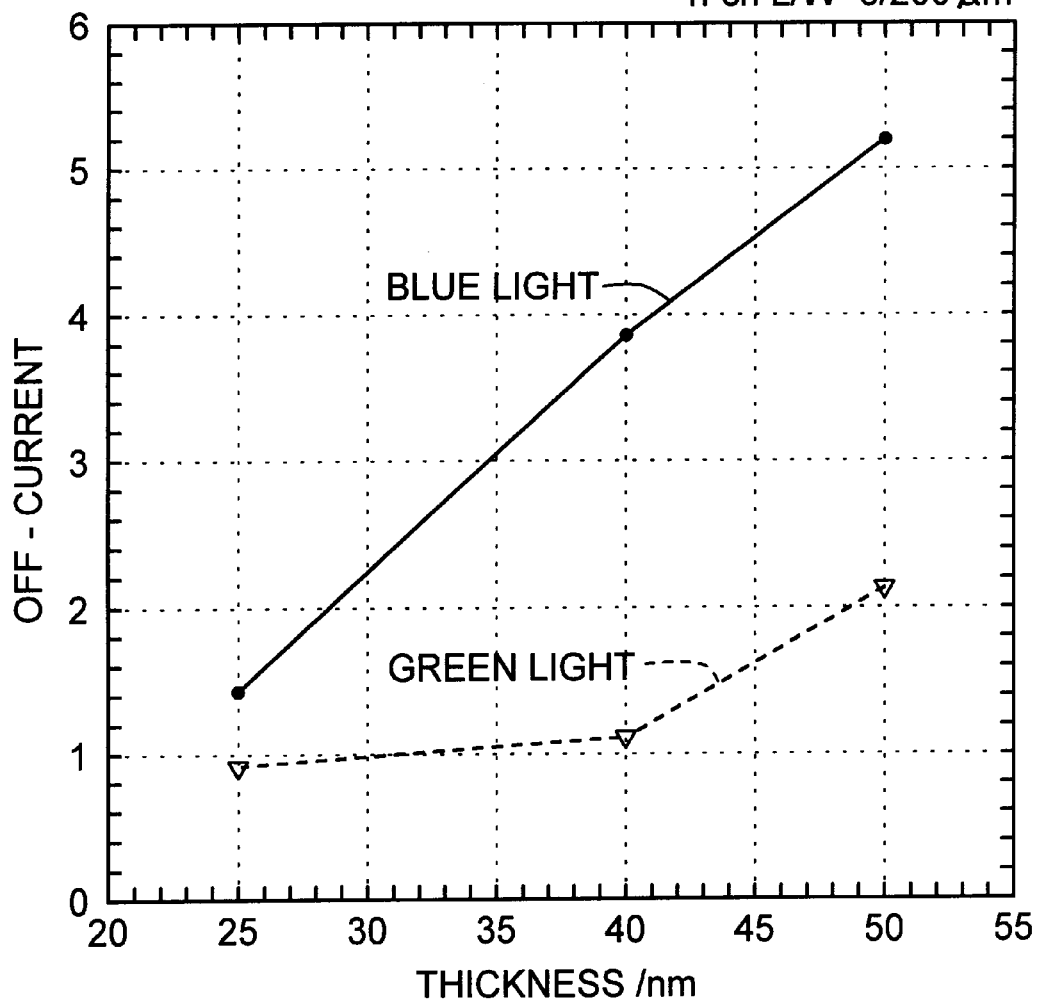

ELECTRONIC APPARATUS HAVING THIN FILM TRANSISTORS

BACKGROUND OF THE INVENTION

1. Field of the Invention

The present invention is directed relates to an electronic apparatus in which an optical engine (optical system) incorporates a liquid crystal display (hereinafter abbreviated as LCD) having a circuit that is constituted of thin-film transistors (hereinafter abbreviated as TFTs). In particular, the present invention relates to an electronic apparatus such as a projector that uses a transmission-type LCD.

2. Description of the Related Art

In recent years, the technique of forming TFTs on a substrate, such as a glass substrate, by using a semiconductor thin film, (typically a silicon thin film) has made rapid progress. Active matrix LCDs, that have a circuit using such TFTs as switching elements and that perform optical modulation by a liquid crystal, are now attracting much attention as next-generation display devices.

Among the electronic apparatuses now attracting a lot of attention and which use an active matrix LCD as a display medium, are transmission-type and reflection-type projectors. FIG. 3A outlines a basic optical engine of a three-panel transmission-type projector.

In FIG. 3A, reference numeral 301 denotes a lamp light source; 302 and 303 are dichroic mirrors that reflect only red light and green light, respectively; 304–306 are full-reflection mirrors; 307–309 are transmission-type LCDs corresponding to R (red), G (green), and B (blue), respectively; 310 is a dichroic prism; and 311 is a projection lens.

Strong light is emitted from the lamp light source 301, and only the R component beam is reflected by the dichroic mirror 302. The R component beam is changed in traveling direction by the full-reflection mirror 306 and enters the R-LCD 307.

Only the G component beam is reflected by the G dichroic mirror 303 and enters the G-LCD 308.

The B component light, that has passed through the dichroic mirrors 302 and 303, is reflected by the full-reflection mirrors 304 and 305 and enters the B-LCD 309.

Light beams carrying video information, that have passed through the R, G, and B-LCDs 307–309, are recombined by the dichroic prism 310 and projected onto a screen by the projection lens 311.

FIG. 3B is a schematic sectional view of each of the transmission-type LCDs 307–309. In FIG. 3B, reference numerals 312 and 313 denote pixel TFTs. A light beam 314 carrying video information that is applied from above is interrupted by black masks 315 and 316.

Since the number of carriers in a semiconductor increases when it is excited by light, it is necessary to prevent a light beam from being applied directly to the active layers of TFTs by using black masks as mentioned above. However, since a substrate 300 on which the TFTs 312 and 313 are formed is as thick as about 0.7–1.1 mm, part of the light beam 314 carrying video information is irregularly reflected inside the substrate 300 to cause stray light 317 and 318.

If stray light reaches an active layer, the number of carriers increases through optical excitation. The increase in the number of carriers results in leak current (off-current) that flows when the TFT is in an off-state. A large leak current may cause a display failure.

SUMMARY OF THE INVENTION

An object of the present invention is to provide an electronic apparatus which is so configured as to suppress leak current that is caused by stray light in the manner as described above (hereinafter called stray light leak current), to such a level that it causes no problems and high-quality image display can be realized.

According to a first aspect of the present invention, there is provided an electronic apparatus having an optical engine including three LCDs, wherein each of the three LCDs has a circuit including a plurality of TFTs; and wherein the TFTs of one of the three LCDs, that is illuminated with the shortest wavelength light among the three LCDs, have a smaller active layer thickness than the TFTs of the other two LCDs.

According to a second aspect of the present invention, there is provided an electronic apparatus having an optical engine including three LCDs, wherein each of the three LCDs has a circuit including a plurality of TFTs; and wherein the TFTs have a smaller active layer thickness as the wavelength of light to illuminate the associated one of the three LCDs becomes shorter.

According to a third aspect of the present invention, there is provided an electronic apparatus having an optical engine including three LCDs for red display, green display, and blue display, respectively, wherein each of the three LCDs has a circuit including a plurality of TFTs; and wherein the TFTs of the LCD for the blue display have a smaller active layer thickness than the TFTs of the LCDs for the red display and the green display.

In the above electronic apparatuses, it is preferable that the TFTs of the LCD for the blue display have an active layer thickness of 30 nm or less, the TFTs of the LCD for the green display have an active layer thickness of 50 nm or less, and the TFTs of the LCD for the red display have an active layer thickness of 100 nm or less.

As described above, one aspect of the present invention is intended to decrease stray light leak current and obtain superior image quality in which display failures such as crosstalk are in such levels as to be not problematic, by optimizing the active layer thickness in accordance with the wavelength of the light for illuminating a LCD.

By optimizing the active layer thickness in accordance with the wavelength of illumination the light, the present invention can also greatly increase the yield.

Crosstalk may be prevented by making every active layer thickness small. However, if the active layers are too thin, there occurs a problem in that the process margins are decreased.

For example, in a step of etching an insulating film on the active layers, the active layers are etched little by little during over-etching. Therefore, if the active layers are too thin, there is a possibility that even the active layers may disappear. Hence, the thin active layers make the process control difficult, possibly resulting in a reduction in yield.

In contrast, in the present invention, the active layers of at least the LCDs for the green display and the red display can be made thick, and hence the reduction in yield can be decreased for those LCDs. Therefore, the reduction in the total yield of a three-panel optical engine can be prevented by thinning the active layers of only the LCD that needs thin active layers.

On the other hand, if an optical engine can be constructed by using three LCDs having the same structure, high productivity is surely obtained because all of the LCDs can be manufactured by a single process. In this case, it is necessary to set the active layer thickness so that an off-current value of the TFTs measured when the same LCD is illuminated with green light or blue light is smaller than or equal to two times an off-current value of the TFTs measured when the LCD is illuminated with red light, where the red light, the green light, and the blue light corrected so as to have the same light intensity.

BRIEF DESCRIPTION OF THE DRAWINGS

FIG. 1 is a graph showing a relationship between the illumination light wavelength and the off-current;

FIG. 2 is a graph showing a relationship between the active layer thickness and the off-current;

FIGS. 8A and 8B show the configuration of a rear type projector according to a fourth embodiment of the present invention;

FIG. 9 shows the configuration of a front type projector according to a fifth embodiment of the present invention; and FIG. 10 is a graph showing a relationship between the active layer thickness and the ratio of the off-current with blue light illumination and the ratio of the off-current with green light illumination to the off-current with red light illumination.

DETAILED DESCRIPTION OF THE PREFERRED EMBODIMENTS

Figure 3A:
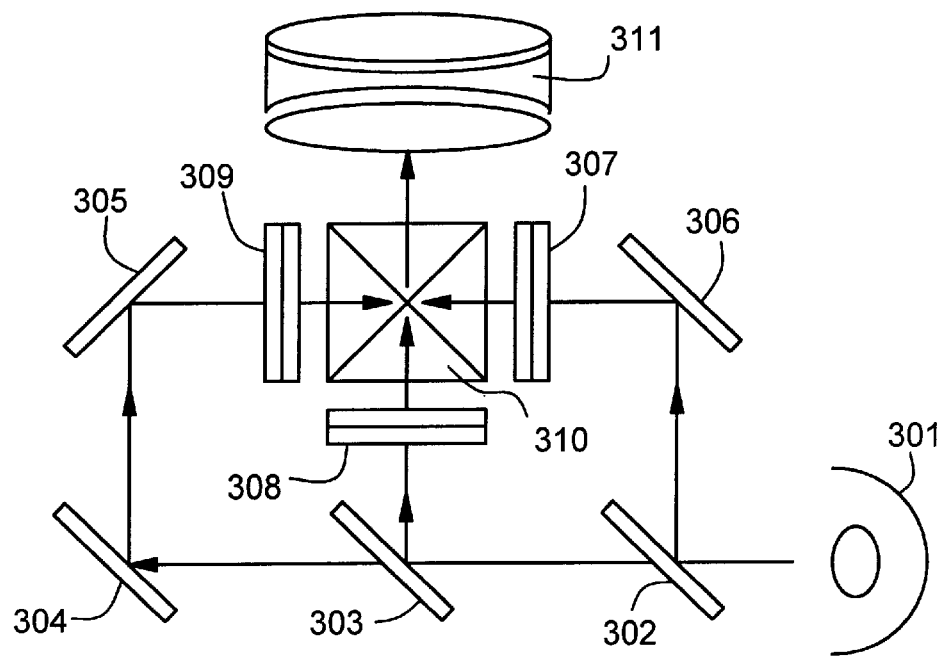
FIGS. 3A and 3B show the configuration of a transmission-type optical engine.
Figure 3B:
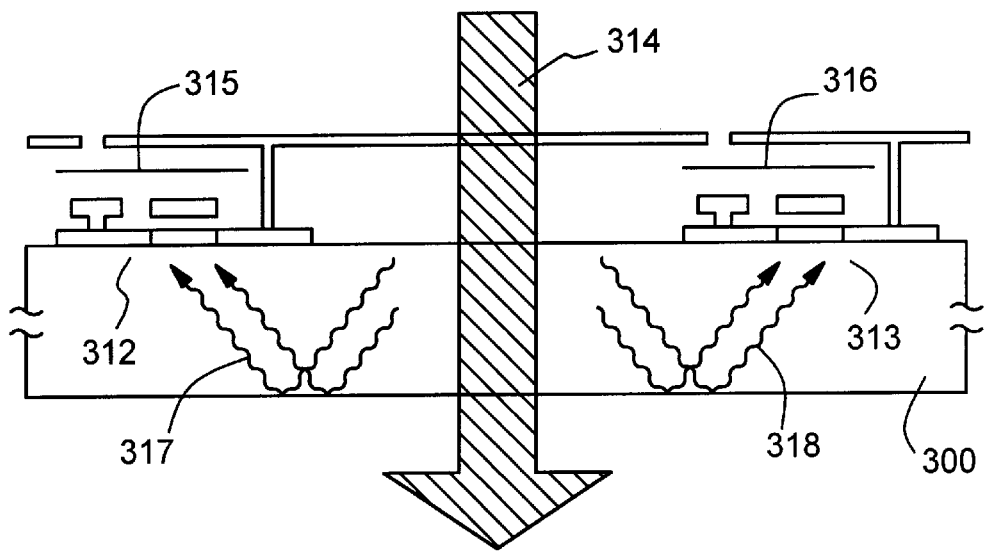

First, experimental facts that have been found by the inventors and have become the basis of the present invention will be described below in detail.

The inventors noted that a display failure called crosstalk frequently occurred in LCDs for blue display in the experimental manufacture of a three-panel transmission-type projector. Crosstalk is color unevenness that is caused by off-current and is greatly affected by stray light leak current occurring in active layers. That is, when LCDs manufactured under the same conditions are used, stray light leak current is larger in a LCD illuminated with blue light than that in LCDs illuminated with light of the other colors.

In view of the above, the inventors studied the dependence of stray light leak current on the wavelength of light for illuminating a LCD, and experimentally studied how stray light leak current varies with the thickness of active layers when the wavelength is varied.

Stray light leak current has extremely small values because it is considered that only about 0.1% or less of the quantity of illumination light contributes to the generation of actual stray light. Since such a very low current tends to cause a measurement error, a variation in stray light leak current with respect to the illumination light wavelength was relatively estimated by conducting the following experiments.

The measured TFTs had three kinds of active layer thickness values, that is, 25 nm, 40 nm, and 50 nm, and a channel length L and a channel width W of 8 μm and 200 μm, respectively. The reason why the channel width W was made large was to allow for the detection of as large a leak current as possible by increasing the area of the channel forming region.

A reference LCD that was regarded as free of crosstalk was set. According to the experiences of the inventors, no such crosstalk lower the display quality which would significantly is generated when a LCD whose pixel TFTs have an active layer thickness of 40 nm (the capacitance of an auxiliary capacitor connected to each pixel is about 50–100 fF) is illuminated with green light. Therefore, this LCD was set as a reference LCD.

Cold light was applied to a green color filter and separated green light was applied directly to the active layers of the TFTs, as mentioned above (L/W=8/200 μm). The resulting off-current (substantially regarded as stray light leak current) was then measured.

The off-current that was measured in this experiment was a drain current measured under conditions where the drain voltage (VD) was 14 V and the gate voltage (VG) was −4.5 V. The off-current values obtained under the above experimental conditions were $0.8 \times 10^{-9}$ to $1.2 \times 10^{-9}$ A, $1.2 \times 10^{-9}$ to $2 \times 10^{-9}$ A, and $2.5 \times 10^{-9}$ to $4 \times 10^{-9}$ A, when the active layer thickness was 25 nm, 40 nm, and 50 nm, respectively.

However, when green light was applied to LCDs whose pixel TFTs had an active layer thickness of 50 nm, crosstalk was observed in some of those LCDs. Therefore, it is presumed that the possibility of occurrence of the crosstalk is high with TFTs whose off-current is larger than $2.5 \times 10^{-9}$ A under the above experimental conditions.

Based on the above experimental results, it is concluded that crosstalk does not occur when pixels are actually formed, as long as TFTs whose off-current is at most $3 \times 10^{-9}$ A or less (preferably $2 \times 10^{-9}$ A or less) under the above experimental conditions are used.

Therefore, this value is used as an off-current reference value of the experiments being discussed. The possibility of the occurrence of crosstalk is estimated based upon whether off-current exceeds this value.

The wavelength dependence of stray light leak current (for red light and blue light) was investigated by conducting an experiment similar to the above by applying cold light to a red or blue color filter. The results are shown in FIG. 1.

FIG. 1 is a graph in which the horizontal and vertical axes represent the illumination light wavelength and the off-current, respectively, and the active layer thickness (parameter) is 25 nm, 40 nm, and 50 nm.

Illumination light of red or blue used in FIG. 1 is one that was corrected. This is because when cold light is color-separated by color filters, light beams of the respective colors that are applied to an experiment sample have differences in light intensity. This is because the transmittance depends on the wavelength.

The inventors employed, as a reference, the light intensity of green light that was obtained by applying cold light to a green color filter, and corrected red light and blue light obtained by applying cold light to red and blue color filters, respectively, so that their light intensity became approximately equal to the light intensity of green light. This allows for the comparison among off-current values of red, green, and blue light.

In FIG. 1, plots in the vicinity of a wavelength of 484 nm correspond to blue light, plots in the vicinity of a wavelength of 538 nm correspond to green light, and plots in the vicinity of a wavelength of 620 nm correspond to red light. Each plot represents an average of 10 measurement values. Although actual spectra of red, green, and blue light have distributions whose peaks are located in the vicinity of the above wavelength values, for simplicity they are identified by the above respective wavelength values.

It is seen from the graph of FIG. 1 that, in the case of the active layer thickness of 25 nm, the off-current value is smaller than $3 \times 10^{-9}$ A which has been set above as the reference value, for each of red, green, and blue light. That is, if the active layer thickness is at least less than or equal to 25 nm, crosstalk should not be generated in each of the red, green, and blue LCDs.

However, when the active layer thickness is 40 nm, only the off-current of blue light, which is $5.1 \times 10^{-9}$ A, exceeds the reference value. That is, crosstalk should be problematic in a blue LCD using pixel TFTs whose active layer thickness is 40 nm. This has been confirmed by applying blue light to actual LCDs that were manufactured experimentally.

When the active layer thickness is 50 nm, the off-current becomes not only about $9.4 \times 10^{-9}$ A with blue light but also $3.8 \times 10^{-9}$ A with green light, exceeding the reference value. It is expected that crosstalk will be generated in each of the blue and green LCDs. In actual experimental manufacture, crosstalk was found not only in LCDs for the blue display but also LCDs for the green display.

FIG. 2 is a graph that was drawn by using the same data as used in FIG. 1 in such a manner that the horizontal axis represents the active layer thickness. It is seen from FIG. 2 that, while almost no variation occurs in the off-current of red light even if the active layer thickness varies, the off-current of blue light increases exponentially as the active layer thickness is increased.

It is also seen from FIG. 2 that the active layer thickness range where the off-current is less than or equal to the reference value $3 \times 10^{-9}$ A is about 100 nm or less (preferably 90 nm or less) in red LCDs, about 50 nm or less (preferably 45 nm or less) in green LCDs, and about 30 nm or less (preferably 25 nm or less) in blue LCDs. The above active layer thickness range for red LCDs was determined by extrapolation.

It is concluded from the above discussions that active layer thickness ranges usable in red LCDs, green LCDs, and blue LCDs are about 90 nm or less, and about 45 nm or less, about 25 nm or less, respectively. That is, crosstalk does not occur if such a condition is satisfied.

However, in actual LCDs, the rate of occurrence of crosstalk decreases as the capacitance of an auxiliary capacitor that is connected to each pixel becomes larger, and the allowable range of off-current varies accordingly. The data of the experiments are ones obtained when the capacitance of an auxiliary capacitor was in a range of 50–100 fF, and it is expected that the allowable active layer thickness ranges will vary with the capacitance.

As described above, to manufacture LCDs in which crosstalk is not generated or is not problematic, the active layer thickness of pixel TFTs constituting a display circuit should be in a proper range that depends on the illumination light wavelength.

Specifically, to suppress stray light leak current which may cause crosstalk, it is desirable that the active layer thickness be decreased as the wavelength of illumination light (emitted from a backlight) becomes shorter. That is, the upper limit of the allowable active layer thickness range decreases in order of the LCD for the red display, the LCD for green display, and the LCD for the blue display.

Next, consideration will be given to a case where the same three LCDs are used in a three-panel projector. In this case, the relationship between the active layer thickness and the off-current, that is obtained by illumination with blue light or green light with an assumption that the off-current that is obtained by illumination with red light is 1.0 (the process margins are considered largest in this case), is as shown in the graph of FIG. 10. FIG. 10 uses the off-current values obtained by the above experiments.

According to FIG. 2, the condition for preventing crosstalk, even if any red, green, or blue light is applied, is that the active layer thickness is 30 nm or less (preferably 25 nm or less). In connection with this fact, it is seen from FIG. 10 that, in the active layer thickness range of 30 nm or less, the off-current ratio with blue light illumination is 2.3 or less, and the off-current ratio with green light illumination is about 1.0 (i.e., the off-current with green light illumination is approximately equal to that with red light illumination).

Therefore, it is understood that when the three LCDs have the same active layer thickness, crosstalk can be inhibited by making the off-current values with blue light illumination and green light illumination less than or equal to a value that is two times (preferably 1.5 times) the off-current value with red light illumination.

That is, it is concluded that such crosstalk which would lower the display quality does not occur if the active layer thickness is set so that off-current values of TFTs measured when a LCD is illuminated with green light and blue light, respectively, are less than or equal to two times (preferably 1.5 times) an off-current value of the TFTs measured when the LCD is illuminated with red light, where the red light, the green light, and the blue light are corrected so as to have the same light intensity.

The present invention will be hereinafter described in detail by using several embodiments.

Embodiment 1

This embodiment is directed to a TFT manufacturing process suitably used in practicing the present invention. Specifically, a description will be made of an example in which an active matrix LCD is manufactured by constructing a pixel matrix circuit, driver circuits, and logic circuits by using TFTs formed on the same substrate. This embodiment will be described with reference to FIGS. 4A–4E, 5A–5D, and 6A–6C.

First, a highly heat-resistant substrate 401 is prepared, and a 300-nm-thick silicon oxide film 402 is formed thereon as an undercoat film. The substrate 401 may be a quartz substrate, a silicon substrate, a crystallized glass substrate (also called a glass ceramics substrate; the strain point should be 750° C. or more), or the like.

After the substrate 401 having an insulative surface has been prepared as described above, an amorphous silicon film 403 is formed by low-pressure CVD. In the present invention, the thickness of the amorphous silicon film 403 is set in a range of 20–100 nm at an optimum value, depending on which of R, G, and B LCDs in which the amorphous silicon film 403 is used.

In this embodiment, the final thickness of the active layers is to be set at 25 nm so as to be suitable for use in a LCD for blue display. Therefore, the thickness in the step of forming the amorphous silicon film 403 is set at 50 nm. Plasma CVD may be used instead if it can provide an amorphous silicon film having the same quality as is obtained by low-pressure CVD.

Then, a 120-nm-thick silicon oxide film as a mask insulating film 404 is formed on the amorphous silicon film 403. Openings, which will become catalyst element adding regions, are formed through the mask insulating film 404 by patterning.

Then, a step of adding an element for accelerating crystallization is executed according to the technique disclosed in Japanese Unexamined Patent Publication No. 8-78329. The entire disclosure of the Japanese Unexamined Patent Publication No. 8-78329 is incorporated herein by reference. In this embodiment, nickel is used as the element for accelerating crystallization and a solution obtained by dissolving a nickel acetate salt containing nickel at 10 ppm in terms of weight in an ethanol solution is applied by spin coating.

As a result, a nickel-containing layer 405 is formed on the surface of the mask insulating film 404. In this state, nickel is in contact with the amorphous silicon film 403 in the openings of the mask insulating film 404.

Figure 4A:
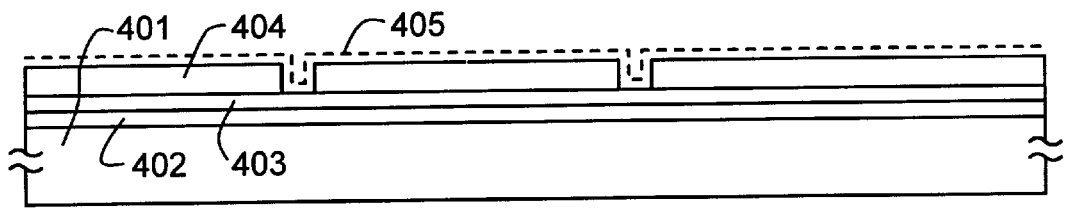
FIGS. 4A–4E, 5A–5D, and 6A–6C show a manufacturing process of a transmission-type LCD according to a first embodiment of the present invention.
Figure 4B:
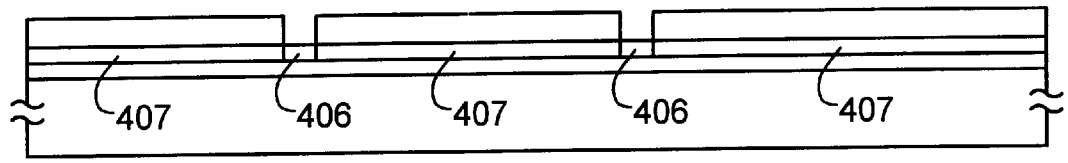

After the state of FIG. 4A has been obtained in the above manner, hydrogen removal is performed at 450° C. for about one hour, and the amorphous silicon film 403 is crystallized by performing a heat treatment at 500°–700° C. (typically 550°–650° C., preferably 570° C.) for 4–24 hours in an inactive atmosphere, a hydrogen atmosphere, or an oxygen atmosphere. In this embodiment, crystallization is caused to proceed by performing a heat treatment at 570° C. for 14 hours (see FIG. 4B).

In this step, crystallization of the amorphous silicon film 403 proceeds with priority from nuclei that are generated in the nickel addition regions 406, whereby crystal regions (lateral growth regions) 407 are formed that have grown approximately parallel with the surface of the substrate 401. The lateral growth regions 407 have an advantage of high overall crystallinity because crystal grains are gathered so as to be arranged relatively regularly.

After completion of the crystallization step, phosphorus is added by using the mask insulating film 404 itself as a mask. It is preferable that phosphorus is added so as to exist in the addition regions at a concentration of $1\times10^{19}$ to $1\times10^{21}$ atoms/cm$^3$ (about 10 times the nickel concentration).

Figure 4C:
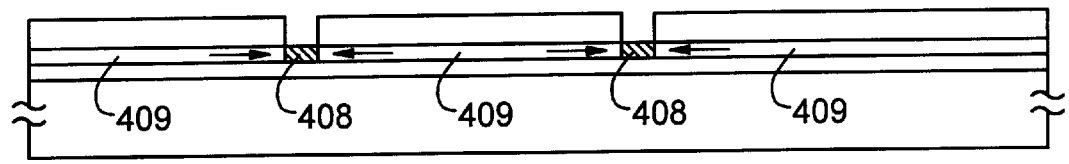

After the formation of phosphorus addition regions 408, a heat treatment is performed at 500°–800° C. (preferably 600°–650° C.) for 2–24 hours (preferably 8–15 hours), whereby nickel in the lateral growth regions is moved to the phosphorus addition regions 408 (moving directions are indicated by arrows in FIG. 4C). As a result, lateral growth regions 409 are obtained where the nickel concentration is reduced to $5\times10^{17}$ atoms/cm$^3$ or less (preferably $2\times10^{17}$ atoms/cm$^3$ or less), as shown in FIG. 4C.

Figure 4D:
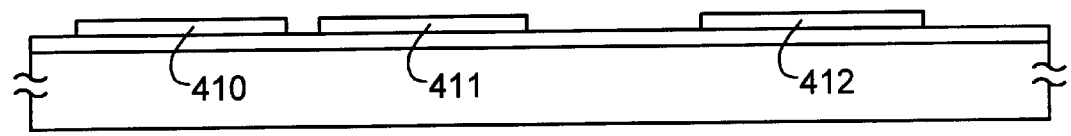
Figure 4E:
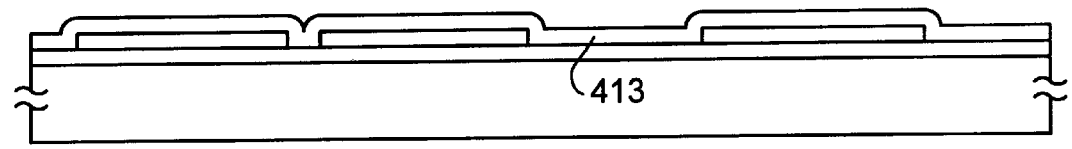

After the nickel gettering step has been completed in this manner, the mask insulating film 404 is removed and then active layers 410–412 are formed by using only the lateral growth regions 409 (see FIG. 4D). In this step, it is preferable to remove the nickel-gettered regions 408 completely, by which reverse diffusion of nickel into the active layers 410–412 can be prevented.

Then, an insulative silicon film as a gate insulating film 413 is formed by plasma CVD or low-pressure CVD so as to cover the active layers 410–412. The thickness of the gate insulating film 413 may be set at 50–150 nm.

After the formation of the gate insulating film 413, a heat treatment is performed at 800°–1100° C. (preferably 950°–1050° C.) in an oxidizing atmosphere, whereby thermal oxidation films (not shown) are formed at the interfaces between the gate insulating film 413 and the active layers 410–412.

The oxidizing atmosphere may be a dry $O_2$ atmosphere, a wet $O_2$ atmosphere, or an atmosphere containing a halogen element (typically hydrogen chloride). Where the atmosphere contains a halogen element, a nickel gettering effect by the halogen element is expected if the insulating film on the active layers are thin.

The optimum temperature and duration of the thermal oxidation step may be determined in consideration of the intended thickness of thermal oxidation films and the throughput. In this embodiment, conditions (950° C. and 30 minutes) for forming 50-nm-thick thermal oxidation films are employed. At the same time, the thickness of the active layers are reduced by 25 nm, so that the final thickness of the active layers becomes 25 nm (see FIG. 4E).

The process so far described is an embodiment of a process that is necessary to manufacture super-polysilicon TFTs. The important components of this process are (1) the solid-phase growth step using a catalyst element, (2) the catalyst element gettering step, and (3) the active layer thermal oxidation step. The technique disclosed in Japanese Unexamined Patent Publication No. 9-312260 can be used as another process that includes the above components. The Japanese Unexamined Patent Publication No. 9-312260 corresponds to a pending U.S. patent application Ser. No. 08/785,489, now U.S. Pat. No. 6,077,713. The entire disclosure of the Japanese Unexamined Patent Publication No. 9-312260 and U.S. Pat. No. No. 6,077,731 is incorporated herein by reference.

The reason why this process is suitably used in practicing the present invention is that an active layer having high crystallinity can be obtained in the form of a very thin film.

Usually, polysilicon obtained by laser crystallization (called low-temperature polysilicon) or polysilicon obtained by high-temperature solid-phase growth (called high-temperature polysilicon) is used in the manufacture of a LCD.

However, it is very difficult for the laser crystallization to form a polysilicon thin film that is 25 nm or less in thickness because of problems with asperity on the film surface called ridges and abrasion.

The high-temperature solid-phase growth can provide good crystallinity only when a relatively thick (about 80–100 nm) amorphous silicon film is crystallized. To obtain a very thin film having a thickness of 25 nm or less, it is necessary to reduce the thickness of a polysilicon film by a large amount of 60 nm or more by a thermal oxidation step or the like.

That is, from the viewpoint of controllability and productivity, it is difficult to obtain a very thin polysilicon film having high crystallinity by laser crystallization or high-temperature solid-phase growth.

In contrast, the process of this embodiment can form a polysilicon film having high crystallinity without causing such problems as abrasion and ridges because an amorphous silicon film of about 50 nm in thickness is crystallized by solid-phase growth using a material such as nickel. Further, the process of this embodiment can provide high productivity because it can easily reduce the thickness to 25 nm or less by utilizing a thermal oxidation step.

As described above, the process of this embodiment is suitable for formation of a very thin polysilicon film of 30 nm or less (preferably 25 nm or less). Therefore, it is desirable to use the process of this embodiment to realize, for example, a feature of the present invention of an active layer of 25 nm or less in thickness used in an LCD for blue display.

Naturally, a known method may be used to manufacture LCDs that are used in the present invention if the method can form a very thin polysilicon film having high crystallinity.

After the gate insulating film 413 has been formed in the above manner, conductive crystalline silicon films as gate electrodes 414–416 are formed. In this embodiment, crystalline silicon films (thickness: 200–300 nm) containing an impurity (phosphorus) for imparting n-type conductivity are formed (see FIG. 5A).

After the formation of the gate electrodes 414–416, the gate insulating film 413 is etched by dry etching with the gate electrodes 414–416 used as masks. In this embodiment, a $CHF_3$ gas is used to etch the silicon oxide film 413.

As a result of the execution of this step, the gate insulating film remains only right under the gate electrodes 414–416 (and gate lines). Naturally, the portions remaining under the gate electrodes 414–416 will actually function as gate insulating films.

Then, an impurity (in this embodiment, phosphorus) for imparting n-type conductivity is added in a state so that the region to form a p-channel TFT (PTFT) is covered with a resist mask 417. Since parts of the low-concentration impurity regions 418 and 419 formed in this step will become LDD (lightly doped drain) regions, phosphorus is added to those regions at a concentration of $1 \times 10^{17}$ to $5 \times 10^{18}$ atoms/$cm^3$ (see FIG. 5B).

Thereafter, the resist mask 417 is removed and then an impurity (in this embodiment, boron) for imparting p-type conductivity is added in a state so that the region to form n-channel TFTs (NTFTs) is covered with a resist mask 420. As in the above case of adding phosphorus, low-concentration impurity regions 421 are formed (see FIG. 5C).

Figure 5A:
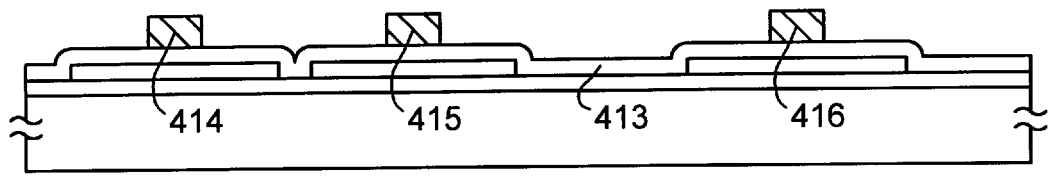
Figure 5B:
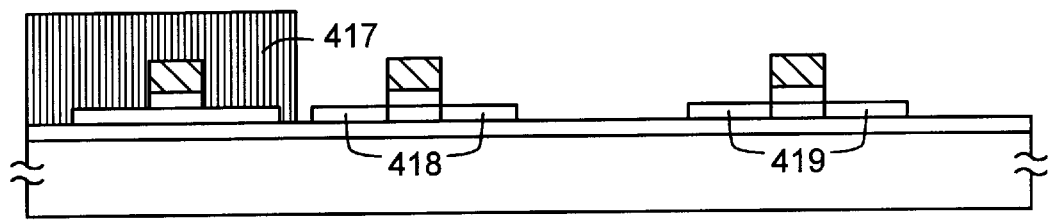
Figure 5C:
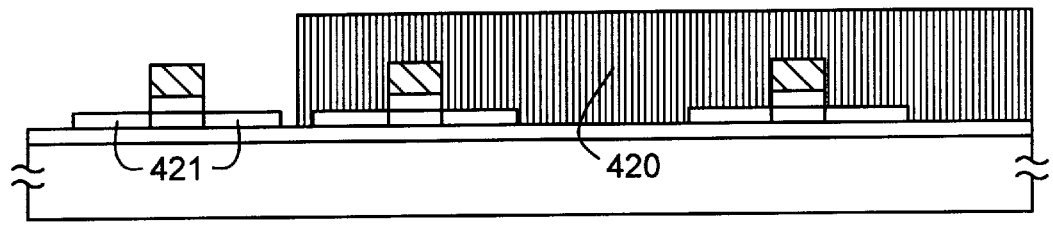
Figure 5D:
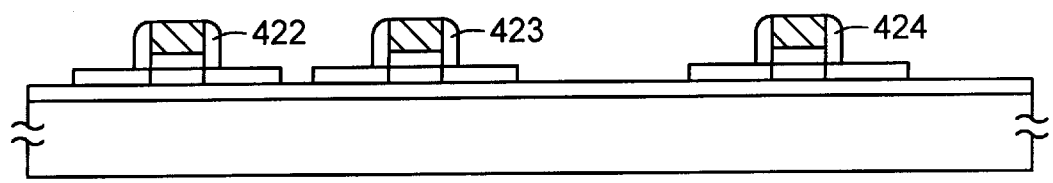

After the state of Fig. 5C has been obtained in the above manner, the resist mask 420 is removed, and then sidewalls 422–424 are formed by etch back. In this embodiment, silicon nitride films are formed as the sidewalls 422–424 (see FIG. 5D). Alternatively, silicon oxide films or silicon oxynitride films may be formed.

After the sidewalls 422–424 have been formed in this manner, phosphorus is again added in a state that the region to form the PTFT is covered with a resist mask 425. At this time, the dose is set higher than in the previous phosphorus adding step.

As a result of the execution of this phosphorus adding step, a source region 426, a drain region 427, low-concentration impurity regions (LDD regions) 428, and a channel forming region 429 of the NTFT to constitute a CMOS circuit are defined. Similarly, a source region 430, a drain region 431, low-concentration impurity regions (LDD regions) 432, and a channel forming region 433 of the NTFT to constitute a pixel matrix circuit are defined (see FIG. 6A).

Thereafter, the resist mask 425 is removed, and then boron is added at a higher dose than in the previous doping in a state that the region to form the NTFTs is covered with a resist mask 434. As a result of the execution of this boron adding step, a source region 435, a drain region 436, low-concentration impurity regions (LDD regions) 437, and a channel forming region 438 of the PTFT to constitute the CMOS circuit are defined (see FIG. 6B).

After completion of the steps of adding impurities to the active layers, the added impurities are activated by performing a heat treatment, such as furnace annealing, laser annealing, or lamp annealing. In this step, damage of the active layers caused by the impurity adding operations is repaired.

Then, a first interlayer insulating film 439, that is a laminated film of a 25-nm-thick silicon nitride film and a 900-nm-thick silicon oxide film is formed. Then, source electrodes 440–442 and drain electrodes 443 and 444 are formed each of which is a Ti/Al/Ti laminated film (thickness: 100/500/100 nm).

Then, a second interlayer insulating film that has a laminated structure of a 50-nm-thick silicon nitride film 445, a 20-nm-thick silicon oxide film (not shown), and 1-$\mu$m-thick polyimide film 446 is formed. Other organic resin films such as an acrylic film and a polyamide film may be used instead of the polyimide film 446. The 20-nm-thick silicon oxide film will function as an etching stopper in dry-etching the polyimide film 446.

After the formation of the second interlayer insulating film, an opening is formed through the polyimide film 446 by etching it in a region where an auxiliary capacitor will be formed later. In this step, only the silicon nitride film 445 is left, or both of the silicon nitride film 445 and the silicon oxide film (not shown) are left at the bottom of the opening.

Thereafter, a 300-nm-thick titanium film is formed and patterned into a black mask 447. The black mask 447 is formed in the pixel matrix circuit in regions that need to be shielded from light, such as regions of the TFT and wiring portions.

In this state, in the opening, the drain electrode 444 of the pixel matrix circuit and the black mask 447 are in close proximity to each other, with the silicon nitride film 445 (or the laminated film of the silicon nitride film 445 and the silicon oxide film) interposed between them. In this embodiment, an auxiliary capacitor 448 is formed in such a manner that the black mask 447 is given a fixed voltage, and the drain electrode 444 and the black mask 447 serve as a bottom electrode and a top electrode, respectively. A large capacitance can be secured because the dielectric is very thin and has large relative permittivity.

After the black mask 447 and the auxiliary capacitor 448 have been formed in the above manner, a 1-$\mu$m-thick polyimide film is formed as a third interlayer insulating film 449. Subsequently, a contact hole is formed, and then a 120-nm-thick transparent conductive film (for example, an ITO film) is formed as a pixel electrode 450.

Figure 6A:
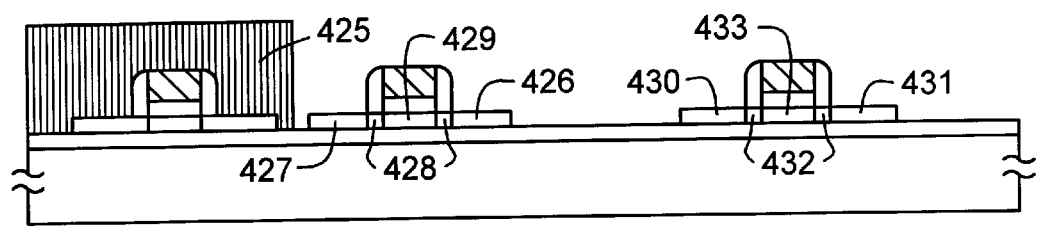
Figure 6B:
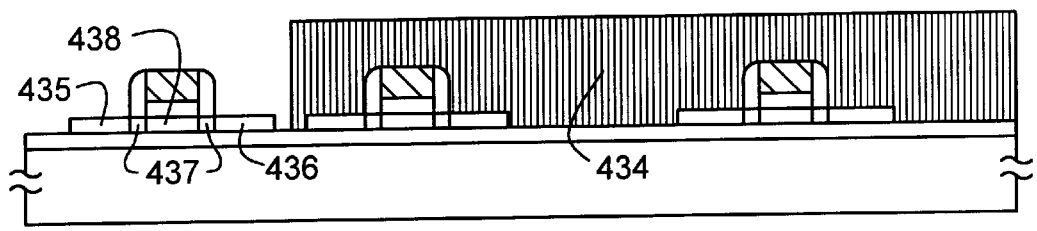
Figure 6C:
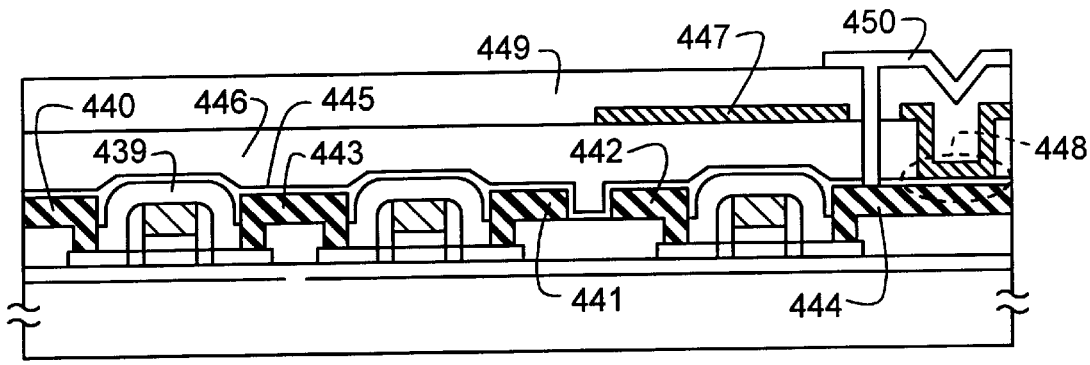

Finally, the entire device is hydrogenated by performing a heat treatment at 350° C. for about 2 hours in a hydrogen atmosphere, whereby an active matrix substrate shown in FIG. 6C is completed. An active matrix LCD (transmission type) is completed by executing a known cell assembling step that causes a liquid crystal layer to be held between the active matrix substrate and an opposed substrate.

The important feature of the present invention is to optimize the active layer thickness of a LCD in accordance with the wavelength of R, G, or B light. Therefore, the structure of the active matrix substrate is not limited to that of this embodiment and may be any structure.

In this embodiment, the thickness of the active layers is set at as small a value as 25 nm for a LCD that is illuminated with blue light. An optical engine for image display may be constructed by combining LCDs having different active layer thickness values such as 40 nm for green display and 50 nm for red display.

The yield can be increased greatly by optimizing the active layer thickness in accordance with the wavelength of each illumination light as described above.

As described above, crosstalk may be prevented by making every active layer thickness small, which, however, causes a problem that the process margins are decreased.

For example, in the step of dry-etching the gate insulating film, the active layers are etched little by little during over-etching. Therefore, if the active layers are too thin, there is a possibility that even the active layers disappear. There is also a possibility that the source and drain regions disappear owing to over-etching in forming the source and drain electrodes.

In contrast, in the present invention, the active layers of at least LCDs for green display and red display can be made thick, and hence the reduction in yield can be decreased for those LCDs. Therefore, the total yield of the three-panel optical engine can be increased.

Embodiment 2

Figure 7:
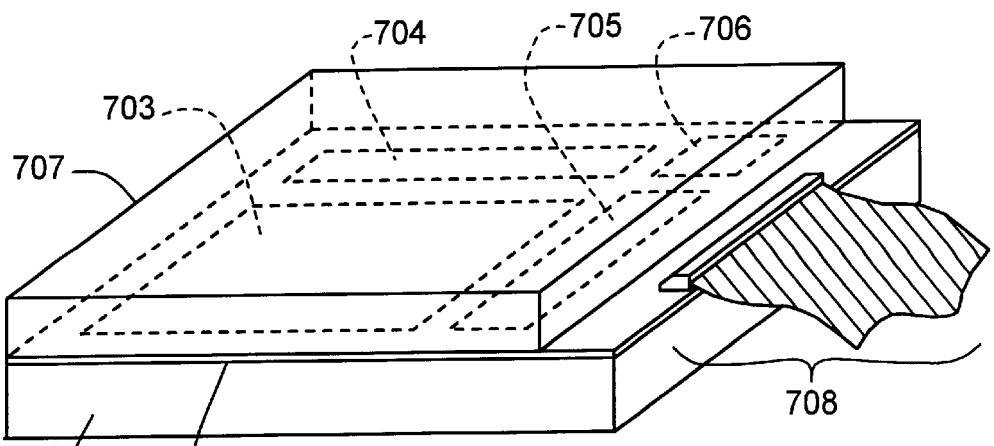
FIG. 7 is a perspective view showing an appearance of a transmission-type liquid crystal module according to a second embodiment of the present invention.

FIG. 7 shows an appearance of a liquid crystal module manufactured by using the process described in the first embodiment. In FIG. 7, reference numerals 701 and 702 denote a substrate and an insulating film comprising silicon as an undercoat film, respectively. A plurality of TFTs have been formed thereon by using a semiconductor film that has been formed according to the manufacturing process of the invention.

Those TFTs constitute a pixel matrix circuit 703, a gate-side driver circuit 704, a source-side driver circuit 705, and a logic circuit 706, that are formed on the substrate 701. An opposed substrate 707 is bonded to the active matrix substrate having the above structure. A liquid crystal layer (not shown) is held between the active matrix substrate and the opposed substrate 707.

In the configuration shown in FIG. 7, it is preferable that the side faces of the active matrix substrate be flush with those of the opposed substrate 707 except those along one sideline. This efficiently increases the number of substrates taken from a large-size substrate.

On the one side where the side faces of active matrix substrate are not flush with those of the opposed substrate 707, part of the opposed substrate 707 is removed to expose part of the active matrix substrate. A FPC (flexible print circuit) 708 is attached to the exposed portion of the active matrix substrate. If necessary, an IC chip (i.e., a semiconductor circuit constituted of MOSFETs formed on single crystal silicon) may be mounted on that portion.

Having extremely high operation speed, TFTs using, as active present layers, a semiconductor thin film formed according to the invention make it possible to form signal processing circuits that operate at a frequency as high as hundreds of megahertz to several gigahertz on the same substrate as the pixel matrix circuit. That is, the liquid crystal module of FIG. 7 is an implementation of a system-on-panel.

Embodiment 3

Although the first and second embodiments are directed to the transmission-type LCD, the present invention can also be applied to electronic apparatuses using a reflection-type LCD.

However, the stray light leak current is not a serious problem in reflection-type LCDs because most of illumination light is reflected by the surface electrodes (pixel electrodes). The effect of the invention is less remarkable in reflection-type LCDs than in transmission-type ones.

Embodiment 4

This embodiment is directed to a projection TV set that incorporates an optical engine manufactured according to the present invention. This projection TV is one that is commonly called a rear projection TV. FIG. 8A is a side view showing an appearance of a projection TV in which an internal structure is shown in a simplified manner. FIG. 8B is a perspective view as seen from above the projection TV and shows its appearance.

In FIGS. 8A and 8B, reference numeral 801 denotes a main body; 802, an optical engine; 803, a reflector; and 804, a screen. Although actually a complex system is configured with addition of other optical systems, only the general configuration will be described in this embodiment.

In the optical engine 802, the TFT active layers are made thinner as the wavelength becomes shorter in order of red, green, and blue. A liquid crystal module incorporated inside the optical engine 802 has a LCD as described in the third embodiment.

Embodiment 5

This embodiment is directed to a projection TV having a different configuration than that in the fourth embodiment. This projection TV is one that is commonly called a front projection TV.

FIG. 9 shows a simplified configuration of a front projection TV. In FIG. 9, reference numerals 901–903 denote a projection apparatus main body, a projection lens, and a screen, respectively.

An optical engine manufactured according to the present invention is provided inside the apparatus main body 901. Light carrying video information is projected onto the screen 903 by the projection lens 902.

The most important feature of front projection TVs is that an image is displayed on a large-size screen, and hence front projection TVs have a great demand for conference or presentation purposes. Typical screen sizes are 100 inches and 200 inches.

As described above, the present invention provides LCDs that prevent display failures such as crosstalk while preventing reduction in yield, and realizes electronic apparatuses (typically projectors) that use such LCDs as display devices.

What is claimed is:

1. An electronic apparatus having an optical engine including three liquid crystal displays, wherein:
    each of the three liquid crystal displays has a circuit including a plurality of thin film transistors; and
    each of the thin film transistors of one of said three liquid crystal displays, that is illuminated with light having a shorter wavelength than light illuminating the other two liquid crystal displays, has at least one active layer having a thickness thinner than each active layer of the thin film transistors of the other two liquid crystal displays.

2. A rear type projector using the electronic apparatus according to claim 1.

3. A front type projector using the electronic apparatus according to claim 1.

4. An electronic apparatus having an optical engine including three liquid crystal displays, wherein:
    each of the three liquid crystal displays has a circuit including a plurality of thin film transistors; and
    each of the thin film transistors has at least one active layer having a thickness which becomes thinner as a wavelength of light to illuminate the associated one of the three liquid crystal displays becomes shorter.

5. A rear type projector using the electronic apparatus according to claim 4.

6. A front type projector using the electronic apparatus according to claim 4.

7. An electronic apparatus having an optical engine including three liquid crystal displays for displaying red color, green color, and blue color, wherein:
    each of the three liquid crystal displays has a circuit including a plurality of thin film transistors; and
    each of the thin film transistors of the liquid crystal display for displaying blue color has at least one active layer having a thickness which is thinner than each active layer of the thin film transistors of the liquid crystal displays for displaying red color and green color.

8. A rear type projector using the electronic apparatus according to claim 7.

9. A front type projector using the electronic apparatus according to claim 7.

10. An electronic apparatus having an optical engine including three liquid crystal displays for displaying red color, green color, and blue color, wherein:

each of the three liquid crystal displays has a circuit including a plurality of thin film transistors; and each of the thin film transistors of the liquid crystal display for displaying blue color has at least one active layer having a thickness which is thinner than each active layer of the thin film transistors of the liquid crystal displays for displaying red color and green color wherein each of the thin film transistors of the liquid crystal display for displaying blue color has at least one active layer having a thickness of 30 nm or less, each of the thin film transistors of the liquid crystal display for displaying green color has at least one active layer having a thickness of 50 nm or less, and each of the thin film transistors of the liquid crystal display for displaying red color has at least one active layer having a thickness of 100 nm or less.

11. An electronic apparatus having an optical engine including liquid crystal displays each of which has a circuit including a plurality of thin film transistors, wherein an off-current value of the thin film transistors measured when the liquid crystal display is illuminated with green light or blue light is smaller than or equal to two times an off-current value of the thin film transistors measured when the liquid crystal display is illuminated with red light, where the red light, the green light, and the blue light are corrected so as to have the same light intensity.

12. A rear type projector using the electronic apparatus according to claim 11.

13. A front type projector using the electronic apparatus according to claim 11.

14. The electronic apparatus according to claim 11, wherein each of the thin film transistors has at least one active layer having a thickness of 30 nm or less.

* * * * *